US009645780B2

(12) United States Patent
Yamamoto

(10) Patent No.: US 9,645,780 B2
(45) Date of Patent: May 9, 2017

(54) DATA STORAGE APPARATUS AND DATA STORAGE METHOD

(71) Applicant: KYOCERA Document Solutions Inc., Osaka (JP)

(72) Inventor: Masakazu Yamamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 66 days.

(21) Appl. No.: 14/607,952

(22) Filed: Jan. 28, 2015

(65) Prior Publication Data

US 2015/0220444 A1 Aug. 6, 2015

(30) Foreign Application Priority Data

Jan. 31, 2014 (JP) ................................. 2014-016486

(51) Int. Cl.
*G06F 12/08* (2016.01)
*G06F 3/12* (2006.01)
*G03G 15/00* (2006.01)

(52) U.S. Cl.
CPC ........... *G06F 3/1285* (2013.01); *G03G 15/50* (2013.01); *G06F 3/122* (2013.01); *G06F 3/1274* (2013.01)

(58) Field of Classification Search
CPC ....... G03G 15/50; G06F 3/122; G06F 3/1274; G06F 3/1285
See application file for complete search history.

(56) References Cited

U.S. PATENT DOCUMENTS

2005/0195435 A1* 9/2005 Kojima ............. H04N 1/00347
358/1.16

FOREIGN PATENT DOCUMENTS

| JP | 2003-015934 A | 1/2003 |
| JP | 2005-227961 A | 8/2005 |
| JP | 2009-237841 A | 10/2009 |
| JP | 2010-182153 A | 8/2010 |
| JP | 2013-074575 A | 4/2013 |

OTHER PUBLICATIONS

An Office Action; "Notice of Reasons for Rejection," issued by the Japanese Patent Office on Jun. 22, 2016, which corresponds to Japanese Patent Application No. 2014-016486 and is related to U.S. Appl. No. 14/607,952.

* cited by examiner

*Primary Examiner* — Yong Choe
(74) *Attorney, Agent, or Firm* — Studebaker & Brackett PC

(57) ABSTRACT

A data storage apparatus includes a memory for data storage. The data storage apparatus further includes a data storing section, an access detecting section, and a data deleting section. The data storing section attaches storage-purpose information to data when storing the data in the memory. The storage-purpose information is setting information indicating a purpose for which the image data is stored. The access detecting section attaches access information to the data stored in the memory upon the data being accessed when the data is used. The access information is setting information indicating a purpose for which the image data is used. The data deleting section deletes the data from the memory at a specific timing when the storage-purpose information and the access information attached to the data match.

11 Claims, 5 Drawing Sheets

| Setting information | Purpose information |
|---|---|
| 0 | Not set |
| 1 | Printing |
| 2 | PC transmission |
| 3 | Fax transmission |
| 4 | Other apparatus transmission |
| 5 | USB storage |
| 6 | Not accessed |

DATA STORAGE APPARATUS AND DATA STORAGE METHOD

INCORPORATION BY REFERENCE

The present application claims priority under 35 U.S.C. §119 to Japanese Patent Application No. 2014-016486, filed Jan. 31, 2014. The contents of this application are incorporated herein by reference in their entirety.

BACKGROUND

The present disclosure relates to a data storage apparatus and a data storage method. In particular, the present disclosure relates to a data storage apparatus and a data storage method that can, in accordance with a purpose for which data is stored, prevent data deletion which is not intended by a user.

An image processing apparatus, such as a multifunction peripheral (MFP), deals with various different types of image data. Image data may for example be in the form of a file stored in a terminal connected to the image processing apparatus via a network, a file generated by an image reading apparatus such as a scanner, or a file received by a facsimile machine.

Image data is not necessarily used or output straightaway after being input to the image processing apparatus. For example, when the image data is input to the image processing apparatus, the image data may at the time of input be stored in a memory included in the image processing apparatus. The memory is for example a hard disk drive (HDD). Image data stored in a specific memory is subsequently used or output at a timing desired by a user in accordance with an objective of the user.

Unfortunately, although the capacity of memory included in image processing apparatuses is increasing year-on-year, such capacity is still limited. Therefore, conditions are typically set with regards to storage of image data in the memory, for example in terms of storage time limit and maximum data amount. For example, any image data that has been stored in the memory for longer than the storage time limit may be deleted irrespective of the user of the image data. Conditions such as described above limit storage of image data.

However, setting of such conditions may causes a situation in which image data stored in the memory by a user is deleted contrary to the intentions of the user or without the user realizing. The above situation is problematic as it results in the user having to once again store their image data in the memory after the image data has been deleted from the memory.

In an example of a response to the problem described above, an output data management apparatus manages data to be output by a specific data output apparatus. The output data management apparatus includes a storage section, an acquiring section, and an adjusting section. The storage section stores the data to be output. The acquiring section receives operation information from the data output apparatus which pertains to an operation history of the data output apparatus. The adjusting section adjusts handling of data for which output has not yet been performed by the data output apparatus, among the data for output stored in the storage section, based on the operation information which is received. Through the above, the data to be output can be managed in a manner that flexibly reflects the probability of the data being output by a user.

In another example, an information storage device includes a connecting section connected to a plurality of host devices and shares electronic information stored by the host devices. The information storage device also includes a communication section, a storage section, and an information acquiring section. The communication section is communicable with the host devices. The storage section stores identification information pertaining to the electronic information stored by the host devices. The information acquiring section refers to the identification information, acquires electronic information from one of the host devices, and stores the acquired information in the storage section. Through the above, the information storage device can store a larger amount of information using a limited storage region by performing storage in accordance with a level of importance of the information.

In another example, an information storage system includes a plurality of storage mediums, an attribute designating section, and a storage medium selecting section. The storage mediums each store information therein. The attribute designating section designates an attribute of information to be stored by the storage mediums. The storage medium selecting section selects a storage medium based on the attribute designated by the attribute designating section. Through the above, a most suitable recording medium can be selected in accordance with the information which is to be stored.

In another example, an image forming apparatus includes a deletion-scheduled data selecting section and a data moving section. The deletion-scheduled data selecting section selects data scheduled for deletion from a storage region when data is to be stored in the storage region which would cause the amount of data stored in the storage region to exceed an upper limit. The data moving section moves the data that is scheduled for deletion to another storage region. Through the above, the data targeted for storage can be readily stored even when the amount of data stored in the storage region exceeds the upper limit.

SUMMARY

A data storage apparatus according to a first aspect of the present disclosure includes a memory for data storage. The data storage apparatus further includes a data storing section, an access detecting section, and a data deleting section. The data storing section attaches storage-purpose information to data when storing the data in the memory. The storage-purpose information is setting information indicating a purpose for which the data is stored. The access detecting section attaches access information to the data stored in the memory upon the data being accessed when the data is used. The access information is setting information indicating a purpose for which the data is used. The data deleting section deletes the data from the memory at a specific timing when the storage-purpose information and the access information attached to the data match.

A data storage method according to a second aspect of the present disclosure is implemented by a data storage apparatus including a memory for data storage. The data storage method includes attaching storage-purpose information to data when storing the data in the memory. The storage-purpose information is setting information indicating a purpose for which the data is stored. The data storage method further includes attaching access information to the data stored in the memory upon the data being accessed when the data is used. The access information is setting information indicating a purpose for which the data is used. The data storage method further includes deleting the data from the memory at a specific timing when the storage-purpose information and the access information attached to the data match.

DETAILED DESCRIPTION

Figure 1:
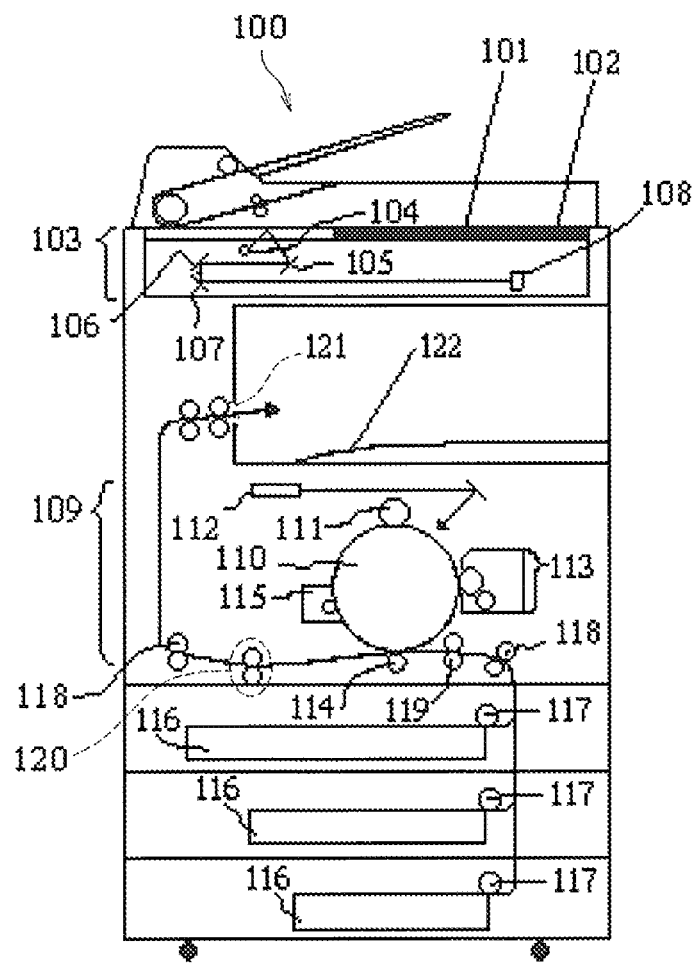
FIG. 1 is a schematic diagram illustrating general internal configuration of an MFP according to an embodiment of the present disclosure.

The following facilitates understanding of the present disclosure by explaining a data storage apparatus according to an embodiment of the present disclosure with reference to the attached drawings. Note that in the drawings, elements that are the same or substantially equivalent are labelled using the same reference signs and explanation thereof is not repeated. The following embodiment is provided as a specific example of the present disclosure and does not in any way limit the technical scope of the present disclosure. Also note that the letter S appearing before numbers in the flowchart is used as an abbreviation for "step".

<Data Storage Apparatus>

The following explains the data storage apparatus according to the embodiment of the present disclosure with reference to FIG. 1. FIG. 1 is a schematic diagram illustrating general internal configuration of an MFP 100. The data storage apparatus is for example an image forming apparatus that handles image data. The image forming apparatus is for example the aforementioned MFP 100. The following explains the MFP 100. Note that detailed description is omitted for elements of the MFP 100 that are not directly relevant to the present disclosure.

An image forming apparatus has at least one out of a printing function, a copying function, a scanning function, and a facsimile function. In a configuration in which the image forming apparatus is an MFP, the image forming apparatus has at least two functions out of the printing function, the copying function, the scanning function, and the facsimile function.

In the present embodiment, a simple explanation is provided for operation of the MFP 100 when a user uses a copying function of the MFP 100. The MFP 100 includes a document table 101, an operation section 102, an image reader 103, a light source 104, mirrors 105, 106, and 107, an imaging element 108, an image former 109, supply cassettes 116, pickup rollers 117, conveyance rollers 118, registration rollers 119, a fixing device 120, an exit port 121, and an internal tray 122.

In order to use the MFP 100, the user first loads a document onto the document table 101 located on an upper surface of a casing of the MFP 100. The user uses the operation section 102 (operation panel) located close to the document table 101 in order to input settings pertaining to image formation (for example, paper size or transmission destination) via an initial screen (operation screen) of the operation section 102. When the user selects the copying function, which corresponds to image formation, and presses a start key located in the operation section 102, the MFP 100 starts image formation (i.e., a printing process).

In the above situation, the light source 104 in the image reader 103 emits light which is subsequently reflected by the document loaded on the document table 101. The mirrors 105, 106, and 107 guide the reflected light to the imaging element 108. The imaging element 108 performs photoelectric conversion of the light guided thereto, thereby generating image data corresponding to the document.

Next, the image former 109 forms a toner image based on the image data. The image former 109 includes a photosensitive drum 110, a charger 111, a light-exposure unit 112, a developer 113, a transferrer 114, and a cleaning unit 115. The photosensitive drum 110 rotates at a constant speed in a specific direction. The charger 111, the light-exposure unit 112, the developer 113, the transferrer 114, and the cleaning unit 115 are located around the photosensitive drum 110 in stated order in the rotational direction thereof.

The charger 111 applies charge uniformly across the surface of the photosensitive drum 110. The light-exposure unit 112 irradiates the charged surface of the photosensitive drum 110 with a laser based on the image data, thereby forming an electrostatic latent image. The developer 113 causes toner to adhere to the electrostatic latent image which is formed, thereby forming a toner image. The transferrer 114 transfers the toner image which is formed onto a recording medium (for example, a sheet of paper or an overhead projector film). The cleaning unit 115 removes residual toner from the surface of the photosensitive drum 110. The series of processes described above are executed through rotation of the photosensitive drum 110.

A sheet is conveyed from one of the plurality of supply cassettes 116 included in the MFP 100. The sheet is picked up from the supply cassette 116 and fed into a conveyance path by a corresponding one of the pickup rollers 117. Each of the supply cassettes 116 stores sheets having different properties to sheets stored in the other supply cassettes 116. A sheet is selected based on settings pertaining to image formation and is fed into the conveyance path. In other words, the sheet is supplied. The supply cassettes 116 may alternatively each store sheets having the same properties. Also, the MFP 100 may include just one supply cassette 116.

The sheet fed into the conveyance path is conveyed such as to pass between the photosensitive drum 110 and the transferrer 114 by the conveyance rollers 118 and the registration rollers 119. The toner image is transferred onto the sheet by the transferrer 114 as the sheet passes between the photosensitive drum 110 and the transferrer 114. The sheet having the toner image transferred thereon is then conveyed toward the fixing device 120.

When the sheet having the toner image transferred thereon passes between a heating roller and a pressure roller included in the fixing device 120, the toner image is fixed to the sheet through application of heat and pressure on the toner image. Appropriate fixing of the toner image to the sheet is ensured by setting an amount of heat applied by the heating roller as appropriate based on the properties of the sheet. Once the toner image has been fixed to the sheet, thereby completing image formation, the sheet is ejected by the conveyance rollers 118, via the exit port 121, toward an internal tray 122 located within the casing of the MFP 100. Ejected sheets are stacked and stored in the internal tray 122. Through the procedure described above, the MFP 100 provides the copying function to the user.

Although the image data is presumed to be data that is generated by the image reader 103 in the above explanation, no particular limitation is placed on the image data. For example, the image data may be data that is transmitted from a terminal that is communicatively connected to the MFP 100 or from a facsimile transmitting apparatus. Image data is stored in a storage section of the MFP 100 for each user. The image data is used or deleted based on instructions from the users. In a situation in which the MFP 100 deletes image data based on setting information attached to the image data, the MFP 100 functions as a data storage apparatus. Detailed description of deletion of image data is provided further below.

Figure 2:
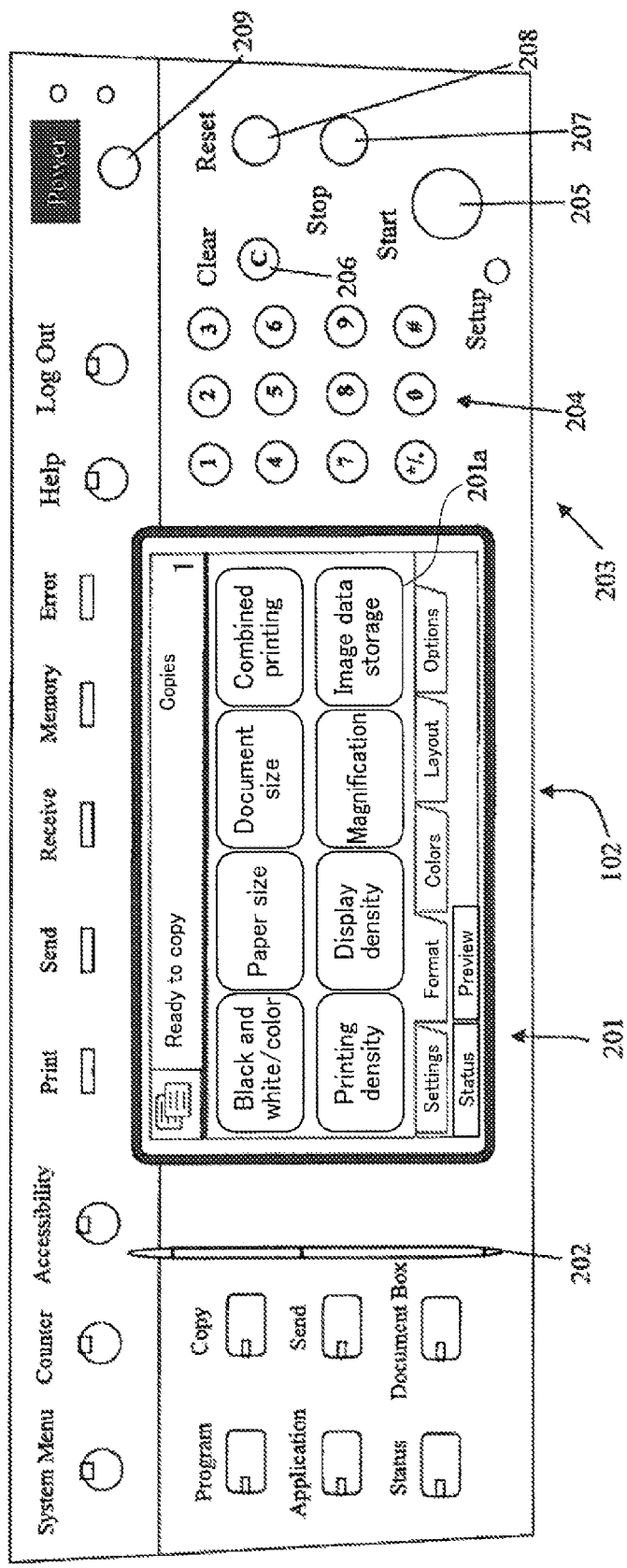
FIG. 2 is a schematic diagram illustrating general configuration of an operation section according to an embodiment of the present disclosure.

FIG. 2 is a conceptual diagram illustrating general configuration of the operation section 102. The user uses the operation section 102 to input settings pertaining to the image formation described above or to check settings that have already been input. In order to input settings using the operation section 102, the user uses a touch panel 201 (operation panel), a stylus 202, or operation keys 203 included in the operation section 102.

The touch panel 201 has both a function of inputting settings (for example, using keys) and a function of displaying the settings. In other words, the user inputs a setting by touching a key for the setting which is included in a screen displayed on the touch panel 201.

A display (not illustrated) such as a liquid-crystal display (LCD) is located on a rear surface of the touch panel 201. The display for example displays an operation screen such as an initial screen. The stylus 202 is provided close to the touch panel 201. When the user touches a tip of the stylus 202 against the touch panel 201, a sensor included in the touch panel 201 detects the tip of the stylus 202 which is in contact with the touch panel 201.

A specific number of operation keys 203 are also located close to the touch panel 201. The specific number of keys are for example a numeric keypad 204, a start key 205, a clear key 206, a stop key 207, a reset key 208, and a power key 209.

Figure 3:
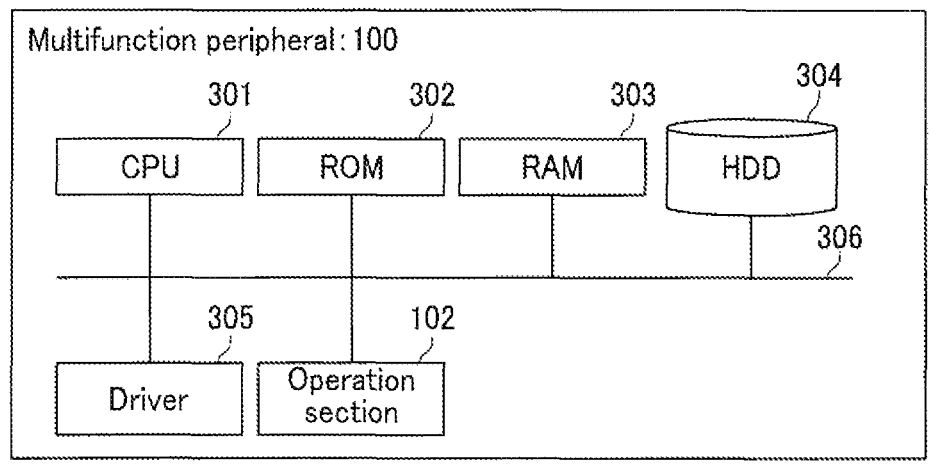
FIG. 3 illustrates configuration of control system hardware of an MFP according to an embodiment of the present disclosure.

The following explains configuration of control system hardware of the MFP 100 with reference to FIG. 3. FIG. 3 illustrates configuration of control system hardware of the MFP 100 according to the present disclosure. Note that detailed description is omitted for elements that are not directly relevant to the present disclosure.

The MFP 100 includes a central processing unit (CPU) 301, read only memory (ROM) 302, random access memory (RAM) 303, an HDD 304, a driver 305 for each of the drivable elements of the MFP 100, an internal bus 306, and the operation section 102. A control circuit of the MFP 100 connects the CPU 301, the ROM 302, the RAM 303, the HDD 304, the driver 305, and the operation section 102 through the internal bus 306.

The CPU 301 for example uses the RAM 303 as a work area for executing a program stored, for example, in the ROM 302 or the HDD 304. Based on an execution result of the program, the CPU 301 for example performs transmission and reception with the driver 305 and the operation section 102 of an instruction, a command, or a signal corresponding to a key, and controls operation of each of the drivable elements shown in FIG. 1.

Elements other than the drivable elements (i.e., elements shown in FIG. 4) are implemented through execution of a program by the CPU 301 of the MFP 100. The elements other than the drivable elements are explained further below with reference to FIG. 4. Either or both of a program and data for implementing each of the elements described below are stored in at least one of the ROM 302, the RAM 303, and the HDD 304.

<Embodiment of Present Disclosure>

Figure 4:
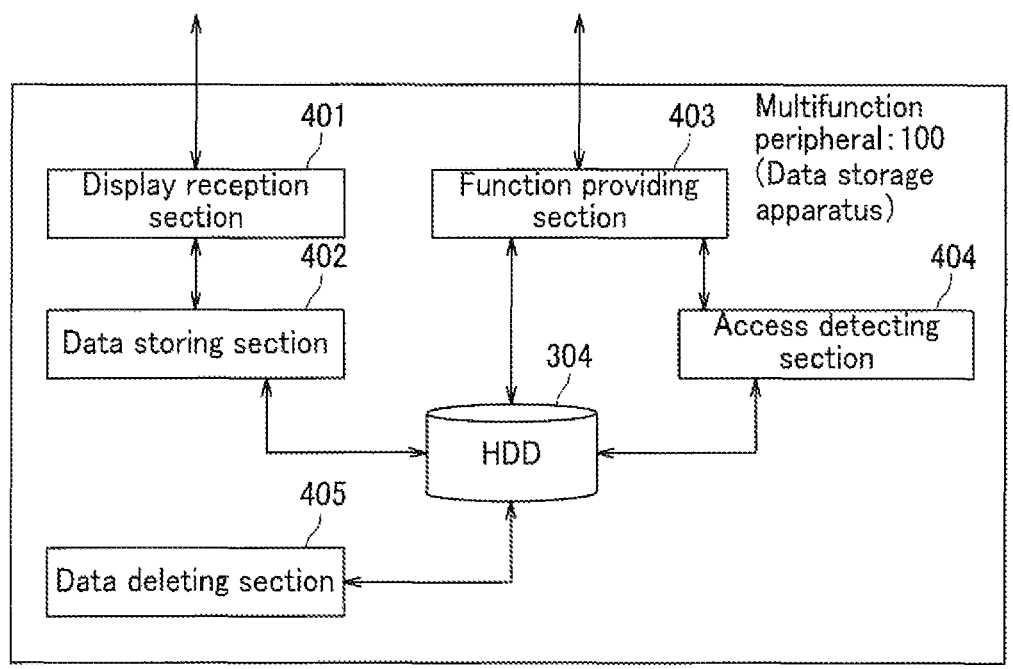
FIG. 4 is a functional block diagram of an MFP according to an embodiment of the present disclosure.
Figure 5:
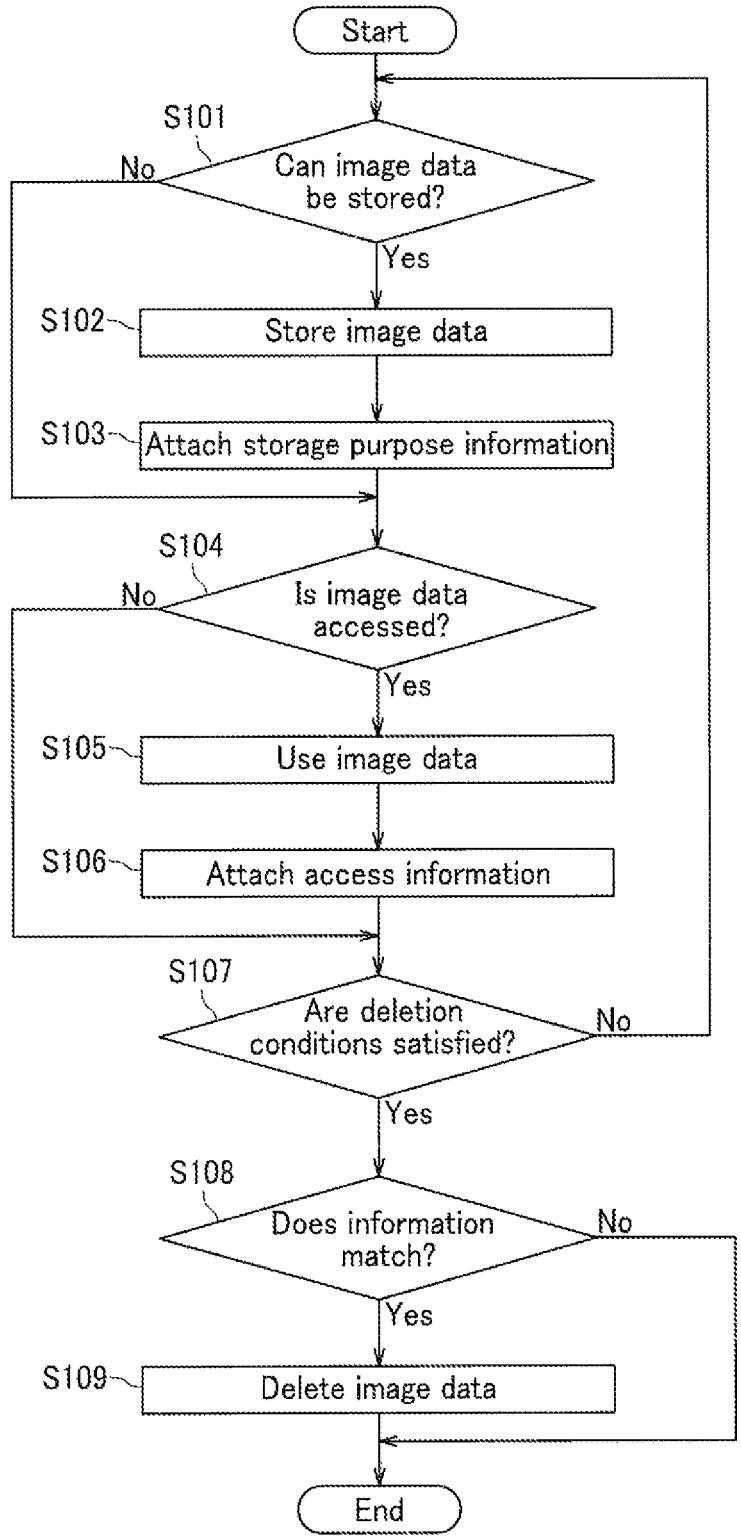
FIG. 5 is a flowchart illustrating a data storage method according to an embodiment of the present disclosure.

The following explains configuration of the MFP 100 and a procedure for performing a data storage method according to the embodiment of the present disclosure with reference to FIGS. 1, 2, 4, 5, 6A, and 6B. FIG. 4 is a functional block diagram illustrating the MFP 100 according to the present disclosure. FIG. 5 is a flowchart illustrating the data storage method according to the present disclosure.

The MFP 100 includes a display reception section 401, a data storing section 402, a function providing section 403, an access detecting section 404, and a data deleting section 405. Upon a user turning on the power of the MFP 100, the display reception section 401 of the MFP 100 is started up. The display reception section 401 causes display of an operation screen on the touch panel 201.

Upon the user designating, for example, an image data storage key 201*a* in the operation screen, the display reception section 401 notifies the data storing section 402 that a designation of the aforementioned key has been received. Upon receiving notification as described above, the data storing section 402 checks an amount of free memory capacity of the HDD 304, which is a storage destination for image data, and thus determines whether or not the image data can be stored in the HDD 304 (FIG. 5: S101).

When the HDD 304 has insufficient free memory capacity and thus the image data cannot be stored in the HDD 304 (FIG. 5: No in S101), the data storing section 402 causes display of a screen on the touch panel 201 which indicates that an image data storage function of the MFP 100 cannot be used. Next, the display reception section 401 once again causes display of the operation screen on the touch panel 201. The process then proceeds to S104.

On the other hand, when the HDD 304 has free memory capacity and thus the image data can be stored in the HDD 304 (FIG. 5: Yes in S101), the data storing section 402 causes display of an image data storage screen on the touch panel 201 which indicates a storage procedure for the image data. The process then proceeds to S102. Next, the user performs an operation on the operation section 102 while looking at the image data storage screen.

The image data storage procedure involves the user first loading a document onto the document table 101. Next, the user touches an image data storage key 201*a* included in the image data storage screen. The data storing section 402 causes the image reader 103 to generate image data by reading the document loaded on the document table 101 and stores the generated image data in a specific memory region of the HDD 304 (FIG. 5: S102). Through the above procedure, the user can store desired image data in a memory region of the HDD 304. Note that a memory region for storing the image data may be designated by the user via the image data storage screen or may be automatically determined in accordance with free memory capacity of memory regions of the HDD 304.

Once the data storing section 402 has completed storage of the image data, the data storing section 402 attaches storage-purpose information to the image data which is setting information indicating a storage purpose (FIG. 5: S103). The storage purpose is a purpose for which the user has stored the image data in the HDD 304.

Figures 6A, 6B:
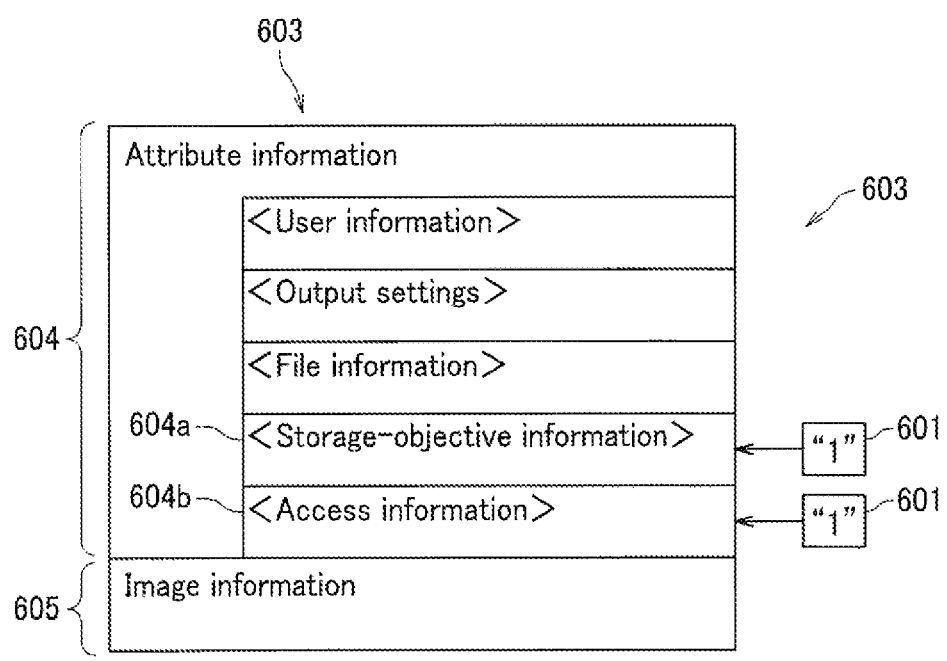
FIG. 6A illustrates an example of a purpose table according to an embodiment of the present disclosure.
FIG. 6B illustrates configuration of image data according to an embodiment of the present disclosure.

FIG. 6A is an example of a purpose table 600. The data storing section 402 may attach the setting information to the image data according to any appropriate method. For example, the setting information may be attached to the image data as described below. Namely, the data storing section 402 refers to the purpose table 600 when storing the image data in the HDD 304. Based on the purpose table 600, the data storing section 402 causes display of a storage purpose selection screen such that the user can select the storage purpose of the image data. The following explains the purpose table 600.

The purpose table 600 for example stores therein, in a linked form, setting information 601 and purpose information 602 corresponding to the setting information 601. Each piece of setting information 601 uniquely identifies a purpose for which image data is stored or used. A piece of setting information 601 is for example a code value of "0", "1", "2", "3", "4", "5", or "6". A piece of purpose information 602 is for example "Not set", "Printing", "PC transmission", "Fax transmission", "Other apparatus transmission", "USB storage", or "Not accessed". "Not set" is selected in a situation in which no purpose is set for storing the image data in the HDD 304. "Printing" is selected in a situation in which the image data is to be printed. "PC transmission" is selected in a situation in which the image data is to be transmitted to a terminal connected via a network. "Fax transmission" is selected in a situation in which the image data is to be transmitted as a facsimile. "Other apparatus transmission" is selected in a situation in which the image data is to be transmitted to another MFP connected via a network. "USB storage" is selected in a situation in which the image data is to be stored in a storage medium (for example, a universal series bus (USB) memory) connected to the MFP 100. "Not accessed" is selected in a situation in which the image data is not to be treated as a target for deletion from the HDD 304. "Not accessed" can for example be used as a storage purpose in a situation in which the image data is to be shared and used by a plurality of users.

FIG. 6B illustrates an example of configuration of image data 603. The data storing section 402 causes display of the purpose information 602 of the purpose table 600 in the storage purpose selection screen. The purpose information 602 is displayed in the storage purpose selection screen as touchable keys. The user views the storage purpose selection screen and touches a key (for example, a "Printing" key) corresponding to a desired purpose for storing the image data 603 in the HDD 304. Upon touching of the key, the data storing section 402 receives a specific piece of purpose information 602 (for example, "Printing"). Next, the data storing section 402 attaches setting information 601, corresponding to the received purpose information 602, to the image data 603 which is a target for storage. For example, when the purpose information 602 is "Printing", setting information of "1" is attached to the image data 603.

The following explains a situation in which the data storing section 402 attaches setting information 601 to the image data 603. The image data 603 for example typically includes specific attribute information 604 and image information 605 for display of the image data 603. The attribute information 604 for example includes user information, output settings, and file information. The image information 605 is data for displaying the image data 603. The data storing section 402 provides an entry for storage-purpose information 604a in the attribute information 604 of the image data 603 and attaches a piece of setting information 601 (for example, "1") as the storage-purpose information 604a. The above enables the data storing section 402 to attach the setting information 601 to the image data 603 without adversely affecting contents of the image data 603.

Once the data storing section 402 has attached the setting information 601 to the image data 603 as the storage-purpose information 604a, the data storing section 402 notifies the display reception section 401 that attachment of the setting information 601 to the image data 603 is complete. Upon receiving notification as described above, the display reception section 401 once again causes display of the operation screen on the touch panel 201 and determines whether or not the user accesses the image data 603 (FIG. 5: S104).

Next, the user designates the copying function key and inputs desired settings for execution of the copying function by the MFP 100. Upon the user designating the image data 603, which has already been stored in the HDD 304, and pressing the start key 205, the display reception section 401 notifies the function providing section 403 that the start key 205 has been pressed. Thus, the function providing section 403 receives an instruction to provide a function. Upon receiving notification as described above, the function providing section 403 refers to a memory region (for example, a folder) of the HDD 304 in which the designated image data 603 is stored and accesses the image data 603. Upon the function providing section 403 accessing the image data 603, the display reception section 401 determines that the user has accessed the image data 603 (FIG. 5: Yes in S104).

Next, the function providing section 403 reads the accessed image data 603 from the HDD 304 and executes the copying function based on the settings input by the user. In other words, the function providing section 403 uses the image data 603 (FIG. 5: S105). Through the above, a desired function is provided to the user with respect to the desired image data 603.

The image data 603 stored in the HDD 304 is not deleted once the function providing section 403 has used the image data 603 and thus the image data 603 remains stored in the HDD 304.

The access detecting section 404 is notified that the function providing section 403 has accessed the image data 603 (or that the function providing section 403 has used the image data 603). Upon receiving notification as described above, the access detecting section 404 attaches access information to the accessed image data 603. The access information is setting information 601 corresponding to a purpose for which the image data 603 is used. Note that the access detecting section 404 may instead detect that the image data 603 has been accessed by the function providing section 403.

The access detecting section 404 may attach the setting information 601 to the image data 603 according to any appropriate method. For example, the setting information 601 may be attached to the image data 603 as described below. Namely, the access detecting section 404 provides an entry in the attribute information 604 of the image data 603 for attaching access information 604b. The access detecting section 404 is in communication with the function providing section 403 which accesses the image data 603. The access detecting section 404 refers to a function (for example, "Printing") which is executed with respect to the image data 603 by the function providing section 403 based on the settings input by the user. Next, the access detecting section 404 refers to the purpose table 600, checks for purpose information 602 corresponding to the function executed by the function providing section 403, and acquires setting information 601 corresponding to the purpose information 602 (for example, setting information 601 of "1" corresponding to "Printing"). Next, the access detecting section 404 refers to the image data 603 accessed by the function providing section 403 and attaches the acquired setting information 601 (for example, "1") as access information 604b. Through the above, the setting information 601 corresponding to the purpose information 602 can be attached to the image data 603 as the access information 604b. Also, the access information 604b corresponding to the purpose for which the image data 603 is used remains in the image data 603 as a history after the image data 603 has been accessed by the function providing section 403.

In the above description, the access detecting section 404 acquires the setting information 601 based on the function executed by the function providing section 403. However, in a different example of configuration, the access detecting section 404 may be in communication with the display reception section 401 and upon the user using the image data 603 stored in the HDD 304, the access detecting section 404 may acquire setting information 601 by receiving a designated of a function or input settings from the display reception section 401.

In S104, if the user leaves the MFP 100 without performing any further operations, the function providing section 403 does not access the image data 603 (FIG. 5: No in S104). Therefore, the process proceeds to S107.

In S107, the data deleting section 405 determines whether or not to delete the image data 603 stored in the HDD 304 (FIG. 5: S107).

The data deleting section 405 may determine whether or not to delete the image data 603 from the HDD 304 in S107 according to any appropriate method. For example, the data deleting section 405 may determine whether or not to proceed with deletion of the image data 603 (FIG. 5: S107) by determining whether or not the current time exceeds a preset time limit for execution of data deletion, by determining whether or not the amount of image data 603 stored in the HDD 304 exceeds a first threshold value, or by determining whether or not the amount of free memory capacity of a memory region in the HDD 304 is less than a second threshold value. The first threshold value indicates a maximum amount of image data 603 that can be stored in the HDD 304. The second threshold value indicates the minimum capacity necessary in the HDD 304 in order to store image data 603.

When the data deleting section 405 determines not to proceed with deletion of the image data 603 from the HDD 304 (FIG. 5: No in S107), the process returns to S101 without the data deleting section 405 deleting the image data 603. In such a situation, the user may then store new image data 603 in the HDD 304 or may cause the copy function to be executed with respect to image data 603 that is already stored. In other words, the data deleting section 405 waits until a specific timing for determining whether or not to delete image data 603 in S107.

In the above description of S106, the access detecting section 404 attaches a single piece of access information 604b to the image data 603. However, as described above, a situation may arise in which the user causes the function providing section 403 to provide a function using image data 603 already stored in the HDD 304 without storing new image data in the HDD 304. Therefore, another piece of setting information 601, corresponding to a purpose for which the image data 603 is used, is attached to the image data 603 in S106 as access information 604b each time the image data 603 is accessed. In other words, a plurality of pieces of setting information 601 are attached to the image data 603.

For example, when the function providing section 403 is caused to provide different functions for different users using a single piece of image data 603 in a situation in which the image data 603 is shared and used by a plurality of users, the image data 603 is used for different purposes. As a consequence, a plurality of pieces of setting information 601, corresponding to a plurality of different purposes of use, are attached to the image data 603 as access information 604b by the access detecting section 404 (FIG. 5: S106).

On the other hand, when the function providing section 403 is caused to provide the same function for each user in a situation in which a single piece of image data 603 is shared and used by a plurality of users, the image data 603 is used for the same purpose. A specific example of the above is a situation in which the image data 603 is for specific materials for distribution and each of the users prints an individual copy of the materials using the image data 603. As a consequence, S106 is complete once the access detecting section 404 has checked that access information 604b already attached to the image data 603 is setting information 601 corresponding to the same purpose of use of the image data 603.

When the data deleting section 405 determines to proceed with deletion of image data 603 in S107 (FIG. 5: Yes in S107), the data deleting section 405 determines whether or not the storage-purpose information 604a and the access information 604b attached to the image data 603 match (FIG. 5: S108).

The data deleting section 405 may determine whether the storage-purpose information 604a and the access information 604b match in S108 according to any appropriate method. For example, the data deleting section 405 may refer to storage-purpose information 604a and access information 604b in attribute information 604 of a specific piece of image data 603 and determine whether or not the setting information 601 of the storage-purpose information 604a matches the setting information 601 of the access information 604b. In a situation in which a plurality of pieces of access information 604b are attached to the image data 603, the data deleting section 405 performs the determination described above with respect to each of the pieces of access information 604b. In other words, the data deleting section 405 determines, for each of the pieces of access information 604b, whether or not the access information 604b matches the storage-purpose information 604a.

In a situation in which the data deleting section 405 determines that the storage-purpose information 604a and the access information 604b match in S108 (FIG. 5: Yes in S108), the image data 603 has been used to achieve the originally intended purpose thereof. In a more specific example, when image data 603 is stored in the HDD 304 for a purpose of printing, once the function providing section 403 has caused execution of a printing function with respect to the image data 603, the image data 603 has been used to achieve the originally intended purpose thereof. As a consequence, the data deleting section 405 deletes the image data 603 from the HDD 304 (FIG. 5: S109). The above enables efficient deletion of image data 603 which has been used to achieve the original purpose thereof.

On the other hand, in a situation in which the data deleting section 405 determines that the storage-purpose information 604a and the access information 604b do not match in S108 (FIG. 5: No in S108), the storage-purpose information 604a of the image data 603 does not match the access information 604*b* of the image data 603. In other words, the image data 603 has not yet been used to achieve the originally intended purpose thereof. In a more specific example, when the image data 603 is stored in the HDD 304 by the user for a purpose of printing and a function of facsimile transmission is executed with respect to the image data 603 by the function providing section 403, storage-purpose information 604*a* and access information 604*b* of the image data 603 do not match. In other words, in the above example the the image data 603 has not yet been used to achieve the originally intended purpose thereof. Therefore, the data deleting section 405 does not delete the image data 603 from the HDD 304. The image data 603 remains stored in the HDD 304. As a consequence, the process of implementing the data storage method is completed without the data deleting section 405 deleting the image data 603 from the HDD 304. The above can prevent image data 603 which has been stored by a user for a specific purpose from being deleted contrary to the intensions of the user when the image data 603 has not yet been used for the specific purpose.

For example, in a situation in which a user stores image data 603 in the HDD 304 but then for some reason leaves the MFP 100 without using the image data 603, which in other words is a situation in which the image data 603 is not accessed by the user or the function providing section 403, setting information 601 is not attached to the image data 603 as access information 604*b*. Thus, in such a situation in which setting information 601 in not attached to the image data 603 as access information 604*b*, the data deleting section 405 determines in S108 that storage-purpose information 604*a* and access information 604*b* of the image data 603 do not match (FIG. 5: No in S108). Therefore, the process of implementing the data storage method is completed without the data deleting section 405 deleting the image data 603 from the HDD 304. The above can prevent the image data 603 from being deleted contrary to the intentions of the user.

The data deleting section 405 may determine whether or not to delete image data 603 based on the type of purpose information 602 that is attached to the image data 603.

For example, when the user stores image data 603 in the HDD 304 and designates a storage purpose of the image data 603 as "Not accessed", the image data 603 does not become a target for deletion from the HDD 304. In other words, the image data 603 becomes a target for protection. Therefore, when the storage-purpose information 604*a* of the image data 603 is "Not accessed", the data deleting section 405 determines in S108 that the storage-purpose information 604*a* and the access information 604*b* of the image data 603 do not match (FIG. 5: No in S108). Thus, when the image data 603 is a protection target, the process of implementing the data storage method is completed without the data deleting section 405 deleting the image data 603 from the HDD 304. Through the above, image data 603 for which deletion thereof would be inconvenient can be stored semi-permanently in the HDD 304 by attaching storage-purpose information 604*a* to the image data 603 which is setting information 601 corresponding to "Not accessed" (i.e., setting information 601 of "6"). As a result, the image data 603 can be prevented from being deleted contrary to the intentions of the user.

Also, when a user for example stores image data 603 in the HDD 304 and designates a storage purpose of the image data 603 as "Not set", the user has no particular purpose for storing the image data 603 in the HDD 304. Therefore, the image data 603 can become a target for deletion from the HDD 304. In other words, the image data 603 does not become a target for protection. When the storage-purpose information 604*a* of the image data 603 is "Not set", the data deleting section 405 determines in S108 that the storage-purpose information 604*a* and the access information 604*b* of the image data 603 match (FIG. 5: Yes in S108). When the image data 603 is not a target for protection, the data deleting section 405 deletes image data 603 from the HDD 304 (FIG. 5: S109), thereby completing the process of implementing the data storage method. In a situation in which for example the user desires that image data 603 be deleted from the HDD 304 based on a specific condition, such as a time limit for performing data deletion or an amount of free memory capacity, the user can ensure efficient deletion of unnecessary image data 603 by designating "Not set" from among the purpose information 602.

As described above with reference to FIGS. 1-5, 6A and 6B, in the present disclosure the MFP 100 functions as a data storage apparatus and includes a HDD 304 that functions as a memory for storing image data 603. The MFP 100 further includes the data storing section 402, the access detecting section 404, and the data deleting section 405. The data storing section 402 attaches storage-purpose information 604*a* to the image data 603 when storing the image data 603 in the HDD 304. The storage-purpose information 604*a* is setting information 601 indicating a purpose for which the image data 603 is stored. The access detecting section 404 attaches access information 604*b* to the image data 603 stored in the HDD 304 upon the image data 603 being accessed when the image data 603 is used. The access information 604*b* is setting information 601 indicating a purpose for which the image data 603 is used. The data deleting section 405 deletes the image data 603 from the HDD 304 at a specific timing when the storage-purpose information 604*a* and the access information 604*b* attached to the image data 603 match. The above configuration can, in accordance with the purpose for which the image data 603 is stored in the HDD304, prevent the image data 603 from being deleted contrary to the intentions of the user.

Note that although in the embodiment of the present disclosure, the MFP 100 storing the image data 603 is used as the data storage apparatus, the data storage apparatus may be any other apparatus for data storage. For example, the same effects can be achieved by applying the data storage apparatus to various different types of image forming apparatuses, image processing apparatuses, image editing apparatuses, image display apparatuses, data processing apparatuses, and terminals.

In the embodiment of the present disclosure, explanation is provided using image data 603 as an example of data, but the present disclosure relates to deletion of any data. Therefore, the same effects can be achieved when applied with respect to other types of data, regardless of the type. Examples of other types of data include text data and audio data.

In the data storage apparatus according to the embodiment of the present disclosure, the target for storage of image data 603 is the HDD 304, but a different storage section (memory) may be used instead of the HDD 304. Examples of other storage sections that can be used include the ROM 302 and the RAM 303.

The data storage apparatus (MFP 100) according to the embodiment of the present disclosure includes each of the elements described above but in an alternative configuration, a storage medium may be provided having a program stored therein for implementing each of the elements. In such a configuration, a data storage apparatus implements each of the elements by reading the program. Therefore, the effects of the present disclosure are achieved by the program which is read from the recording medium. Furthermore, operations performed by each of the elements can be provided as a method of storage on a distributable storage medium.

Also, the present disclosure can be provided as a program that is individually distributed via telecommunication lines or the like for causing execution by a computer. In such a configuration, a CPU cooperates with various circuits other than the CPU to implement control operations in accordance with the data storage method according to the present disclosure. Each of the elements implemented by the program and the CPU can also be configured using dedicated hardware. The aforementioned program can be recorded onto and distributed as a computer-readable recording medium such as a CD-ROM.

What is claimed is:

1. A data storage apparatus comprising:
    a memory for data storage;
    a purpose table that stores therein, in a linked form, plural pieces of setting information and plural pieces of purpose information each corresponding to one of the plural pieces of setting information;
    a data storing section configured to attach storage-purpose information to data by referring to the purpose table when storing the data in the memory, the storage-purpose information being information to which a piece of setting information linked to a piece of purpose information indicating a purpose for which the data is stored is attached among the plural pieces of purpose information;
    an access detecting section configured to attach access information to the data stored in the memory by referencing the purpose table upon the data being accessed when the data is used, the access information being information to which a piece of setting information linked to a piece of purpose information indicating a purpose for which the accessed data is used is attached among the plural pieces of purpose information; and
    a data deleting section configured to delete the data from the memory at a specific timing when the piece of setting information attached to the storage-purpose information and the piece of setting information attached to the access information match.

2. A data storage apparatus according to claim 1, wherein the data deleting section deletes the data when the data is not a target for protection and does not delete the data when the data is a target for protection.

3. A data storage apparatus according to claim 1, wherein the data deleting selection determines that the storage-purpose information and the access information do not match when the data has not yet been accessed.

4. A data storage apparatus according to claim 1, wherein the data includes attribute information, and
    the data storing section provides an entry in the attribute information for attaching the storage-purpose information.

5. A data storage apparatus according to claim 1, wherein the data includes attribute information, and
    the access detecting section provides an entry in the attribute information for attaching the access information.

6. A data storage apparatus according to claim 1, wherein the data deleting section does not delete the data from the memory when the storage-purpose information and the access information attached to the data do not match.

7. The data storage apparatus according to claim 1, wherein
    the data deleting section
        determines whether or not to delete the data stored in the memory, and
        upon determining that the data is to be delete, determining whether or not the piece of setting information attached to the storage-purpose information attached to the data and the piece of setting information attached to the access information match.

8. The data storage apparatus according to claim 7, wherein
    the specific timing is a timing at which the data deleting section determines whether or not to delete the data stored in the memory after the access detecting section attaches the access information to the data.

9. The data storage apparatus according to claim 7, wherein
    the data deleting section determines whether or not to delete the data stored in the memory by determining whether or not current time exceeds a preset time limit for execution of data deletion.

10. The data storage apparatus according to claim 7, wherein
    the data deleting section determines whether or not to delete the data stored in the memory by determining whether or not an amount of free memory capacity of a memory region in the memory is less than a second threshold value, and
    the second threshold value indicates a minimum capacity necessary in the memory in order to store image data.

11. A data storage method implemented by a data storage apparatus including a memory for data storage and a purpose table that stores therein, in a linked form, plural pieces of setting information and plural pieces of purpose information each corresponding to one of the plural pieces of setting information, the data storage method comprising:
    attaching storage-purpose information to data when storing the data in the memory by referencing the purpose table, the storage-purpose information being information to which a piece of setting information linked to a piece of purpose information indicating a purpose for which the data is stored is attached among the plural pieces of purpose information;
    attaching access information to the data stored in the memory by referencing the purpose table upon the data being accessed when the data is used, the access information being information to which a piece of setting information linked to a piece of purpose information indicating a purpose for which the accessed data is used is attached among the plural pieces of purpose information; and
    deleting the data from the memory at a specific timing when the piece of setting information attached to the storage-purpose information and the piece of setting information attached to the access information attached to the data match.

* * * * *